(12) United States Patent
Lantagne et al.

(10) Patent No.: US 11,697,126 B2
(45) Date of Patent: Jul. 11, 2023

(54) GRANULAR LITTER CLEANING APPARATUS AND PROCESS

(71) Applicant: TECHNOLOGIE HOOLA ONE INC., Sherbrooke (CA)

(72) Inventors: Jean-David Lantagne, Quebec (CA); Jean-Felix Tremblay, Rimouski (CA); Samuel Duval, Nicolet (CA); Alexandre Savard, Sainte-Petronille (CA); Philippe Gosselin, Quebec (CA); Christophe Caron-Garant, Sherbrooke (CA); Francois Pontbriand, Beloeil (CA); Edouard Dumas-Longpre, Sherbrooke (CA); Marc-Alexandre Santerre, Quebec (CA); Dany Audette, Laval (CA); Simon Trepanier, Granby (CA); Christophe Tremblay, Sherbrooke (CA)

(73) Assignee: TECHNOLOGIE HOOLA ONE INC., Sherbrooke (CA)

( * ) Notice: Subject to any disclaimer, the term of this patent is extended or adjusted under 35 U.S.C. 154(b) by 805 days.

(21) Appl. No.: 16/690,502

(22) Filed: Nov. 21, 2019

(65) Prior Publication Data
US 2021/0154682 A1 May 27, 2021

(51) Int. Cl.
*B03D 1/14* (2006.01)
*B03D 1/08* (2006.01)
(Continued)

(52) U.S. Cl.
CPC .......... *B03D 1/1468* (2013.01); *B03D 1/082* (2013.01); *B03D 1/1456* (2013.01);
(Continued)

(58) Field of Classification Search
None
See application file for complete search history.

(56) References Cited

U.S. PATENT DOCUMENTS

| 3,284,282 A | 11/1966 | Immel |
| 3,568,839 A | 3/1971 | Dunlea, Jr. |

(Continued)

FOREIGN PATENT DOCUMENTS

| EP | 0104099 A2 | 3/1984 |
| EP | 0314853 A1 | 5/1989 |

(Continued)

*Primary Examiner* — Clare M Perrin
(74) *Attorney, Agent, or Firm* — Norton Rose Fulbright Canada LLP

(57) ABSTRACT

A granular litter cleaning apparatus comprises a separation system having a separation tank adapted to receive a mixture of granules and plastic litter, and water therein, the separation tank having a top opening, and a closeable bottom outlet, and at least one water inlet for feeding water to the separation tank. A collect subsystem is for conveying a mixture of granules and plastic litter to the separation tank. A pump system is in fluid communication with the water inlet. The pump system is operated to raise a level of water in the separation tank to skim water with plastic litter out through the top opening of the separation tank. The closeable bottom outlet is openable to empty the separation tank from granules decanted in a bottom of the separation tank. A process for separating plastic litter from granules is also provided.

12 Claims, 6 Drawing Sheets

(51) Int. Cl.
   *E02B 15/10* (2006.01)
   *B03D 1/02* (2006.01)
   *C02F 1/24* (2023.01)
   *B03D 3/00* (2006.01)

(52) U.S. Cl.
   CPC ......... *B03D 1/1462* (2013.01); *B03D 1/1493* (2013.01); *E02B 15/106* (2013.01); *B03D 1/028* (2013.01); *B03D 3/00* (2013.01); *C02F 1/24* (2013.01)

(56) References Cited

U.S. PATENT DOCUMENTS

| | | |
|---|---|---|
| 3,701,421 A | 10/1972 | Maxwell |
| 4,014,390 A | 3/1977 | Teixeira |
| 4,410,426 A | 10/1983 | Cloutier |
| 5,302,210 A | 4/1994 | Whyte |
| 5,406,019 A | 4/1995 | Dean |
| 5,693,222 A * | 12/1997 | Galvan .................... B03D 1/22 210/194 |
| 6,306,309 B2 * | 10/2001 | Ekenback ........... B01D 24/4689 210/792 |
| 6,640,906 B2 | 11/2003 | Ohzeki et al. |
| 8,944,253 B2 | 2/2015 | Ward |
| 2002/0046968 A1 | 4/2002 | Hartleitner et al. |
| 2005/0274651 A1 | 12/2005 | Daniels et al. |
| 2014/0027386 A1 * | 1/2014 | Munisteri .......... B01D 21/2494 210/243 |
| 2014/0138288 A1 * | 5/2014 | Ward ........................ B07B 1/02 209/12.2 |
| 2020/0215551 A1 * | 7/2020 | Tuominen ............. B03D 1/1406 |

FOREIGN PATENT DOCUMENTS

| | | | |
|---|---|---|---|
| EP | 2213375 A1 | 8/2010 | |
| EP | 3115118 A1 * | 1/2017 | |
| EP | 3115118 A1 | 1/2017 | |
| WO | 2004079099 A1 | 9/2004 | |
| WO | WO-2004079099 A1 * | 9/2004 | ............ E01H 12/00 |
| WO | 2015147805 A1 | 10/2015 | |

* cited by examiner

GRANULAR LITTER CLEANING APPARATUS AND PROCESS

TECHNICAL FIELD

The present disclosure relates to an apparatus and associated process used for cleaning small size particles such as plastic from a granular material such as sand on polluted beaches, soil, gravel, pebbles, etc.

BACKGROUND OF THE ART

Due to its mechanical properties, its ease of manufacture, and/or its cost effectiveness, among other things, plastic material is now commonly used in the modern industry. However, humans release an important amount of plastic to the environment. From all the plastic that goes into the environment, a significant portion ends up onto shorelines, as carried by the water. The presence of polymeric waste on shorelines may be a hazard to wildlife, ecosystems and/or detrimental to human health. It is desirable to remove it from the environment.

Previous methods for cleaning marine plastic waste, such as the one described in U.S. Pat. No. 4,014,390, involves the use of heavy machinery to remove large pieces of trash in order to clean up a beach. The heavy machinery uses the difference of size between sand and plastic, to recover plastic bigger than, e.g., approximately half an inch, leaving smaller pieces into the beach. Consequently, smaller plastic particles may remain in the sand, which smaller plastic particles may still be hazardous to wildlife because of their size allowing animals to swallow them. Furthermore, such heavy machinery may recover non plastic items that is bigger than half an inch, and this may include natural matters that are essential for beach ecosystems.

Decantation tanks are commonly used as settling devices for decanting mineral slurries, such as in International Application Publication No. WO2003039707A1. Such decantation tank technologies are used mostly to separate solid particles with higher densities from liquid like water with a lower density.

Other methods use flotation tank for industrial purposes, such as those described in U.S. Pat. Nos. 3,284,282, 3,568, 839, European reference EP 2213375, US Patent Application Publication No. 20050274651, but are not adapted to be used in beach cleanup applications. Such systems often operate in closed loop where water is always recovered and reintegrated in the system, which makes for a bulky configuration. In beach cleanup applications, the solid that is decanted and removed from the flotation tanks is sand. Because of sand's high rate of water absorption, there is too much water loss in the system to use closed loops. Furthermore, some of the systems use mechanisms like screw conveyors to convey sand. In corroded and sandy environments like beaches, prior art mechanisms may not be adapted for beach use in terms of durability and maintenance of the separation device.

SUMMARY

In accordance with an embodiment of the present disclosure, there is provided a granular litter cleaning apparatus comprising: a separation system having a separation tank adapted to receive a mixture of granules and plastic litter, and water therein, the separation tank having a top opening, and a closeable bottom outlet, and at least one water inlet for feeding water to the separation tank; a collect subsystem for conveying a mixture of granules and plastic litter to the separation tank; a pump system in fluid communication with the water inlet; wherein the pump system is operated to raise a level of water in the separation tank to skim water with plastic litter out through the top opening of the separation tank; and wherein the closeable bottom outlet is openable to empty the separation tank from granules decanted in a bottom of the separation tank.

In accordance with another embodiment of the present disclosure, there is provided a process for separating plastic litter from granules comprising: supplying a separation tank with a mixture of granules with plastic litter; feeding water into the separation tank; decanting granules and floating the plastic litter; feeding additional water in the separation tank to skim water with the plastic litter from a top of the separation tank; and outletting granules and water from a bottom of the separation tank.

BRIEF DESCRIPTION OF THE DRAWINGS

The present disclosure will be best understood by reference to the following detailed description when read in conjunction with the accompanying drawings, wherein.

DETAILED DESCRIPTION OF THE PREFERRED EMBODIMENTS

Figure 1:
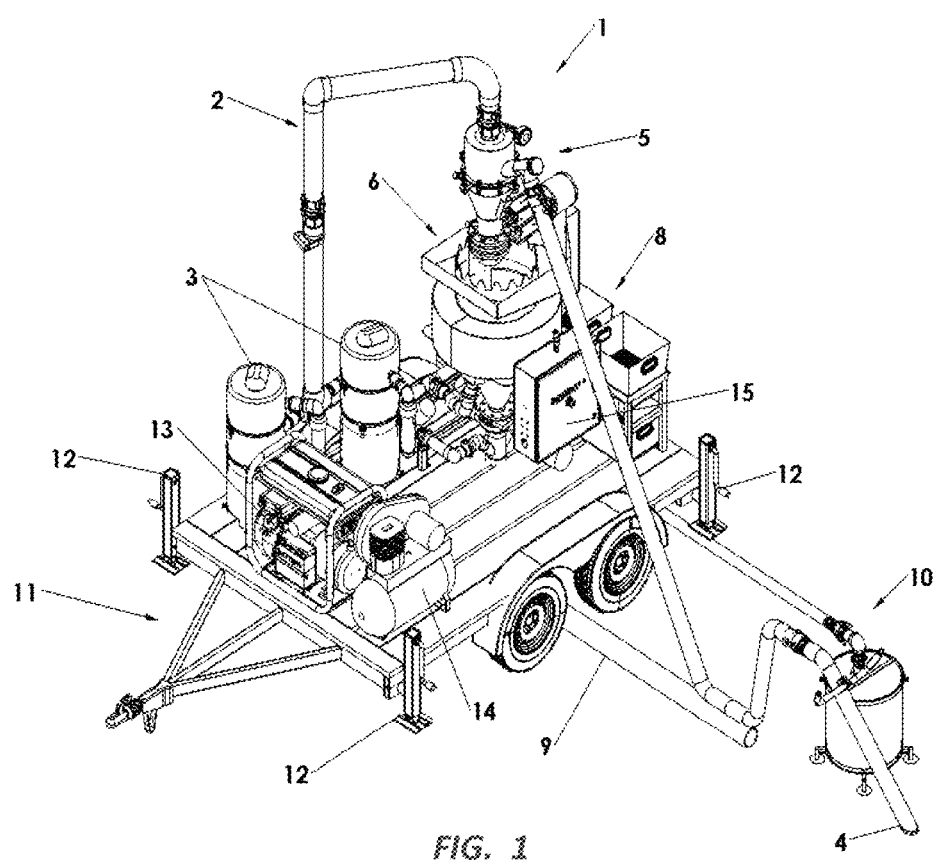
FIG. 1 is a perspective view of a granular litter cleaning apparatus in accordance with the present disclosure.
Figure 2:
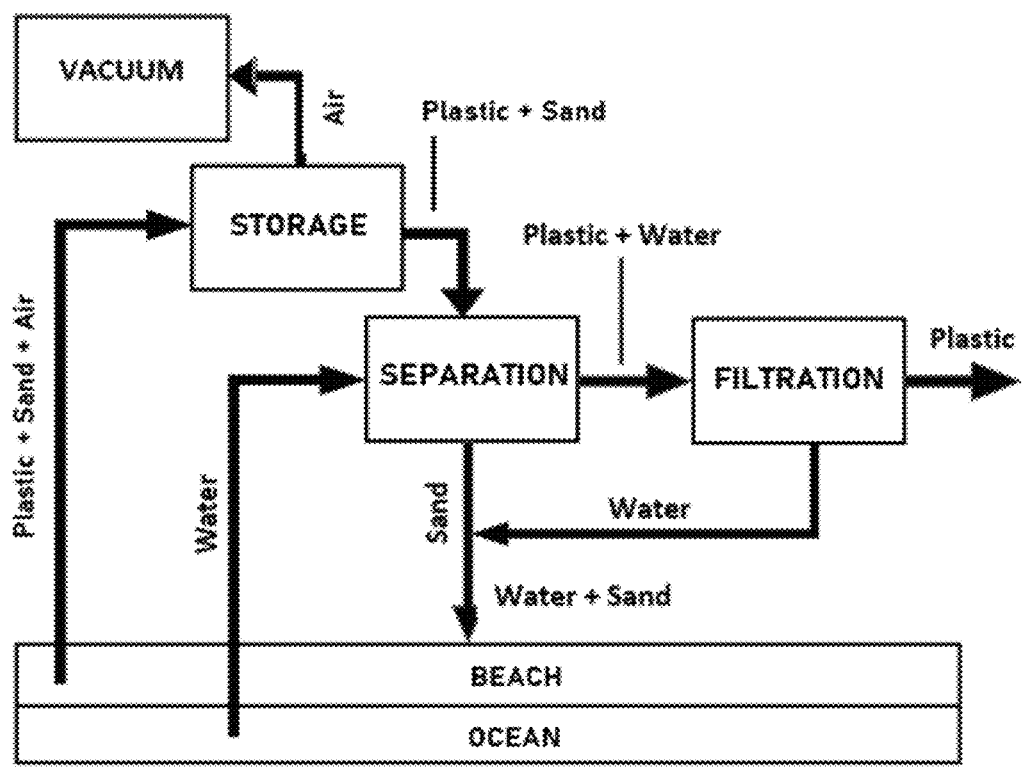
FIG. 2 is a block diagram of a process for removing litter from sand in accordance with the present disclosure.

FIG. 2 shows a block diagram that explains the process of granular litter cleaning in accordance with the present disclosure. The process and apparatus described herein may be used for removing small size particles such as plastic from a granular material (i.e. granules) such as sand on polluted beaches, soil, gravel, pebbles, etc As the process and apparatus described herein are particularly suited for use on a beach or like shoreline, the following description will refer to sand. However, the process and/or apparatus may be used in other applications as mentioned above, whereby the reference to sand in the exemplary embodiments is not limitative. The process pertains to interactions between matters and a cleaning apparatus such as the one shown as cleaning apparatus 1 in FIG. 1. In accordance with the process, due to a vacuum system, e.g., in the form of an air conveyor, an air flow is created and permit suction, e.g., straight from the beach, a mixture of sand, plastic litter and air into a storage tank. The plastic and the sand are kept in a storage tank while air continues to the vacuum system. For example, appropriate filters are used to separate solids from the air in the vacuum system. The mixture of sand, plastic and other residue is then routed into a separation system where water is also routed from a water source. The water source, when cleaning shore lines, may be water from the adjacent body of eater (e.g., sea, lake). In the separation system, plastic and sand are separated by the respective flotation of plastic and decanting of sand. A mix of plastic and water may be skimmed from the separation system. The mix of plastic and sand may then enter the filtration unit where plastic can be recovered, while water is exhausted from the process with the sand from the separation system to the environment.

FIG. 1 is a perspective view of a granular litter cleaning apparatus 1 that may be used to remove litter particles from a sandy environment. For example, the granular litter cleaning apparatus 1 may be used to perform the process described above for FIG. 2. In this example, the cleaning apparatus 1 is mounted on a trailer 11 and illustrates the general operation of the system according to an embodiment of the disclosure. However, the apparatus 1 may be stationed, or may be on other displaceable systems, such as strollers, buggies, an endless track device, etc. In this following description, the cleaning apparatus 1 is described as being used to collect plastic from sandy beaches, although it may be used in other circumstances to filter out polymeric particles from sand or the like. In an embodiment, the trailer 11 or like vehicle or wheeled device may be part of the apparatus 1.

In the illustrated example, the trailer 11 on which the cleaning apparatus 1 is mounted on can be levelled and secured by levelling jacks 12, with four such levelling jacks 12 being shown. The levelling jacks 12 are located at each corner of the trailer 11. Fewer or more levelling jacks 12 may be present, and are a solution among others to level the apparatus 1. As described hereinafter, the cleaning apparatus 1 may perform some skimming, whereby it may be advantageous (though optional) to keep the apparatus 1 substantially level. The levelling jacks 12 are an option among others, with a hydraulic table or bench being another.

Still referring to FIG. 1, a collect subsystem 2 is part of the apparatus 1. The collect subsystem 2 may be composed of one or more vacuum unit 3, with two being shown in FIG. 1. The vacuum units 3 are in fluid communication with a storage tank 5, to maintain a negative vacuum in the storage tank 5. According to one embodiment of the present disclosure, a suction tool 4 is a working end of the collect subsystem 2 and is in fluid communication with the storage tank and thus to the vacuum effect. The working end of the suction tool 4 is the suction end of the apparatus 1, that enables a mixture of sand and particles to be routed to the storage tank 5. The expression "subsystem" is used herein to describe groups of components of the cleaning apparatus 1. The expressions "system", "assembly", etc could also be used. Accordingly, the expression "subsystem" should not be viewed as limitation.

In the embodiment of FIG. 1, a separation system 6 is mounted below the storage tank 5. The separation system 6 includes a pump system 10 that supplies water to a remainder of the cleaning apparatus 1. The apparatus 1 in the embodiment of FIG. 1 may also have a waste recovering system 8 used to recover litter particles from the collected mixture and a sand evacuation pipe 9 that allows sand to be rejected out of the cleaning apparatus 1.

In one embodiment, electrical components are powered by a power generator 13 that may be fixed to the trailer 11, or that may be part of a frame of the apparatus 1. The power generator 13 may power a compressor 14 that supplies air to pneumatics components of the cleaning apparatus 1 described below and to a controller unit 15 that controls the interaction between all the subsystems of the apparatus 1. The controller unit 15 may include a central processing unit or other processor to operate the various components of the apparatus 1 in accordance to a sequence that may correspond to the process of the present disclosure. The controller unit 15 may further include a non-transitory computer-readable memory communicatively coupled to the processing unit and comprising computer-readable program instructions executable by the processing unit for effecting steps of the process described herein.

Figure 3:
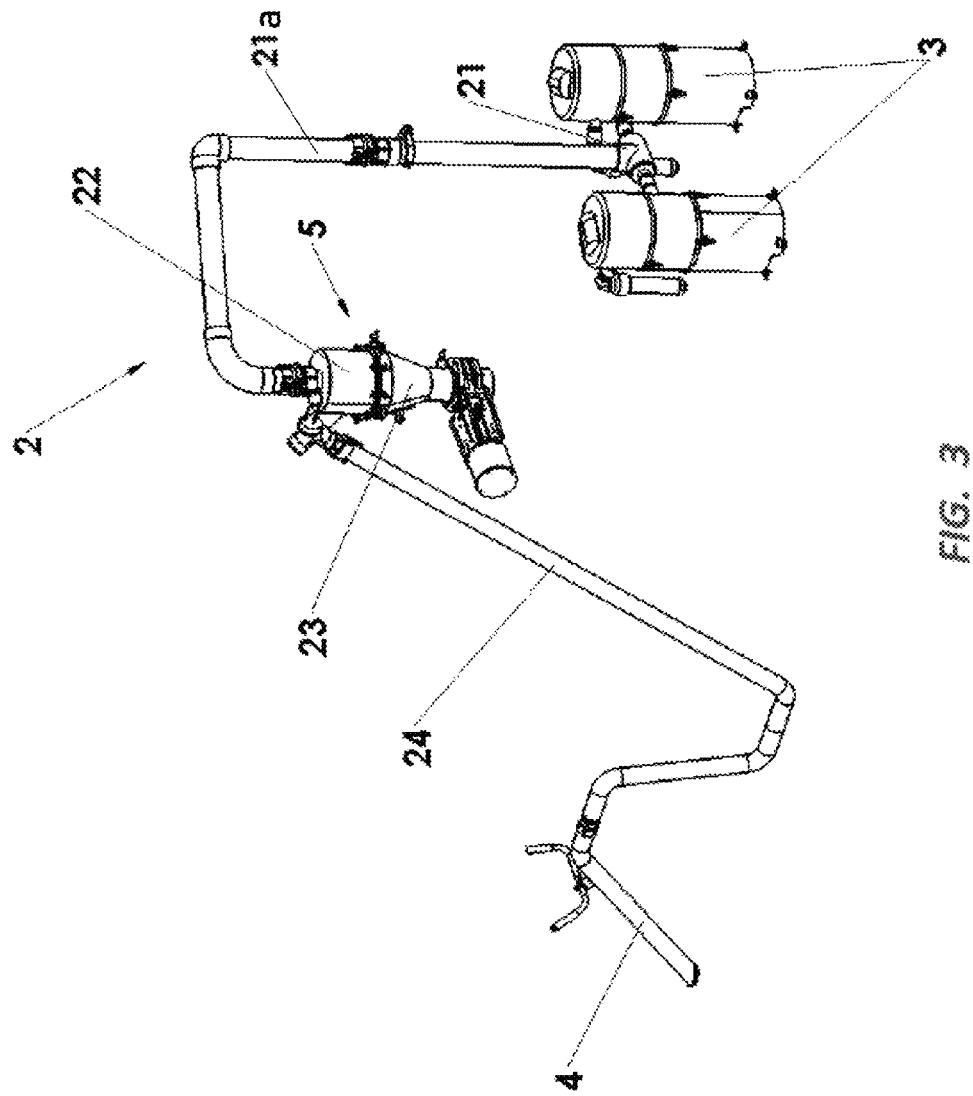
FIG. 3 is a perspective view of a collect subsystem of the granular litter cleaning apparatus of FIG. 1.

FIG. 3 is a perspective view illustrating the collect subsystem 2 showed in FIG. 1. In one embodiment, the two vacuum units 3 are connected in parallel and in fluid communication via a T-connection pipe 21 (among other possibilities, a Y pipe being another) capable of establishing and maintaining a negative vacuum in the storage tank 5, via pipe 21A. A valve may be present in the T-connection pipe 21 for switching from one vacuum unit 3 to another if two vacuum units 3 are present. For the vacuum units 3 to be used one at a time. In another embodiment, the use of the vacuum units 3 in parallel may enhance the vacuum effect by augmenting the flow of air in the air conveyor defined by the collect subsystem 2. The storage tank 5 may or may not be composed of an upper tank portion 22 and a lower tank portion 23. The tank portions 22 and 23 may optionally be detached from each other for transportation purpose and assembled together for the operation of the apparatus 1, though this is merely an option. In this example, a mixture of sand and polymeric litter is collected in the environment with an airflow created by the vacuum unit(s) 3 and creating a suction effect at the free end of the suction tool 4, which may be an open ended pipe that is part of the air conveyor of the collect subsystem 2. In the present embodiment, the mixture passes through a vacuum pipe 24 and the solid matters are stored in the lower tank portion 23 while the air can be routed through to the vacuum unit(s) 3. A filter may be present at the junction between the pipe 21A and the tank 5, to ensure that solids remain in the tank 5. The lower tank portion 23 may taper downwardly relative to the cylindrical shape of the upper tank portion 22. As alternatives, the tank 5 may have the shape of an upside down cone or frusto cone, or that of a cylinder. Other shapes are considered as well.

Figure 4:
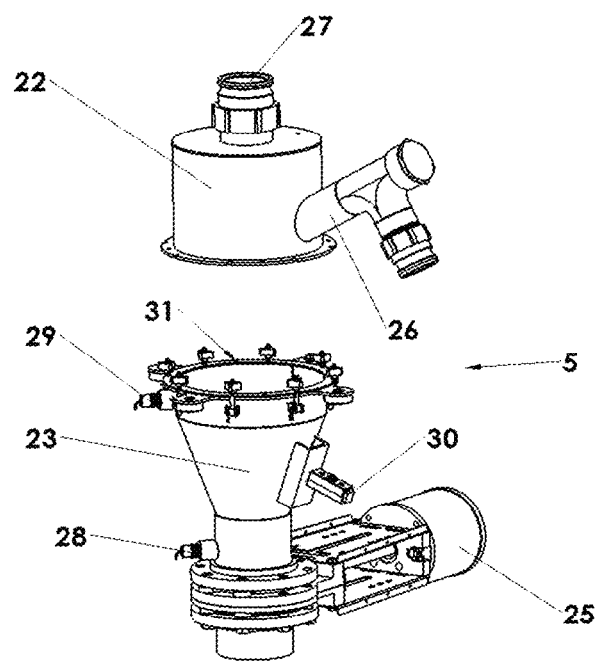
FIG. 4 is an exploded perspective view of a storage tank of the granular litter cleaning apparatus of FIG. 1.

FIG. 4 is an exploded perspective view of an exemplary configuration of the storage tank 5 used to store the mixture collected by the collect subsystem 2 shown in general overview in FIG. 3. The upper tank portion 22 has an air output port 27 that may be on a top cover thereof. A cyclonic input 26 may be provided on a side wall of the upper tank portion 22 so the vacuum pipe 24 and the storage tank 5 may be fluidly connected to one another. In one embodiment, the cyclonic input port 26 is joined tangentially to the upper tank portion 22 to generate friction between the solid mixture and the inside wall of the upper tank portion 22 when the flow of air and solids enters the storage tank 5. The friction may reduce the velocity of the solids which may then fall to the lower tank portion 23. This is one of the mechanisms used to prevent solid particles from getting into the pipe 21A. As the solid mixture fall into the lower tank portion 23 of the storage tank 5, the air goes through the air output port 27 and continues to the vacuum unit(s) 3.

In one embodiment, the lower tank portion 23 collects the mixture. When the level of mixture reaches an upper limit, the collect subsystem 2 may exhaust a batch of the mixture. In an embodiment, a sensor, such as a capacitive sensor 29, an optical detector, etc detects that the level of mixture has been reached, and operated a metering device. The metering device may be at a bottom end of the tank 5 to control the amount of solids exiting the tank 5. The metering device may also seal off the bottom of the tank 5, so as not to lose vacuuming power therethrough. In an embodiment, the metering device is embodied by a pneumatic knife valve 25 that is activated and opens the bottom part of the lower tank portion, 23, such as through a gate valve, guillotine, etc. In another embodiment, the metering device includes a sealed rotary valve, and an actuator (e.g., motor) powered to outlet a desired feed of mixture out of the collect subsystem 2. A vibrator 30 may or may not be present, and may be connected on a conical side of the lower tank portion 23. The vibrator 23 may be activated so as to help the solid mixture down through the opening into the separation system 6. The mixture continues to exit the storage tank 5. The outlet operation may, in an example, be ended once the level reaches a lower limit, as detected by another sensor 28. The sensors 28 and 29 may be the same. At this moment, the metering device, e.g., pneumatic knife valve 25 closes itself and seals off the bottom of the lower tank portion 23. In an embodiment, the vacuum operation is stopped intermittently during the outletting of the mixture through the bottom of the tank 5. In such an embodiment, the vacuum operation can start once the outletting concludes. In an embodiment in which the tank 5 is made of two assembled parts, i.e., the tank portions 22 and 23, a gasket seal 31 or equivalent sealing configuration may be installed at the junction to avoid or reduce any vacuum losses.

Figure 5:
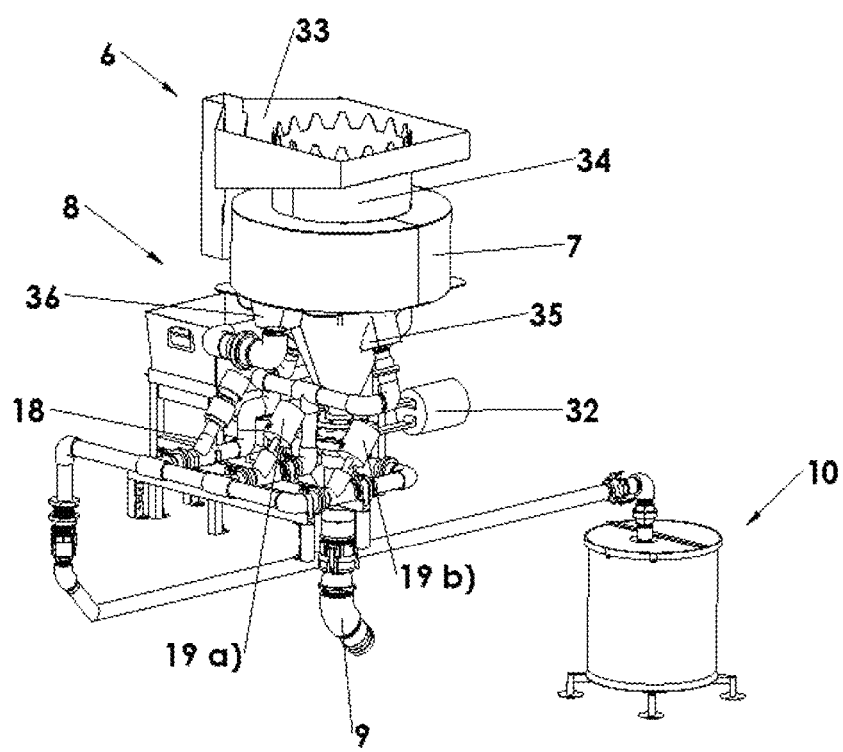
FIG. 5 is a perspective view of a separation system of the granular litter cleaning apparatus of FIG. 1.

FIG. 5 is a perspective view of an exemplary embodiment of the separation system 6 of the cleaning apparatus 1. FIG. 5 includes many of the components introduced in FIG. 1 above. In the illustrated embodiment, the mixture that is output from the storage tank 5 fall directly into a flotation tank 34. The flotation tank 34 is an upstanding receptacle that is open at the top, as a possible embodiment. Another embodiment could feature a receptacle having window(s) in its side wall(s) for water to escape the receptacle through the window(s). "Top opening" may encompass the different options. The expression "top" does not necessarily mean at the very top of the flotation tank 34, but may mean instead above a given level, or above the outlet. The pump system 10 supplies water into the separation system 6 where valves may regulate the supply of water into the flotation tank 34. For example, an on-off valve 19a is used to guide the water flow coming from the pump system 10 into one or more turbulent jet opening 35 in fluid communication with the flotation tank 34. In this example, turbulent jets of water may be used to destroy sand and/or plastic aggregates, so that no plastic decant as aggregates with the sand particles into the lower part of the flotation tank 34.

A flow regulation valve 18 may be connected to the pipes that lead the water to two laminar jet openings 36. The jet openings 36 are in fluid communication with the flotation tank 34 in such a way that their ends open into a water divergent ring 7. In one embodiment, a gutter 33 surrounds the upper part of the flotation tank 34 to recover the overflowing mix of plastic and water into the waste recovering system 8. The plastic particles floating at the top of the flotation tank 34 are therefore skimmed out of the flotation tank 34 by overflow. In this example, the flow regulation valve 18 assures that the flow of water entering the flotation tank 34 is steady no matter the head loses in the system.

Another metering device may be present at the bottom of the flotation tank 34. For example, the metering device is a separation knife valve 32 is used to seal the lower part of the flotation tank 34. Other valves may also be present. At the end of a separation sequence in the process, the metering device, e.g., separation knife valve 32, opens to evacuate the decanted sand out of the separation system 6, via the outlet at the bottom of the flotation tank 34. At the same time, another valve, such as an on-off valve 19b, opens so as to induce a water flow to convey the sand through the sand evacuation pipe 9 and finally into the environment.

Figure 6:
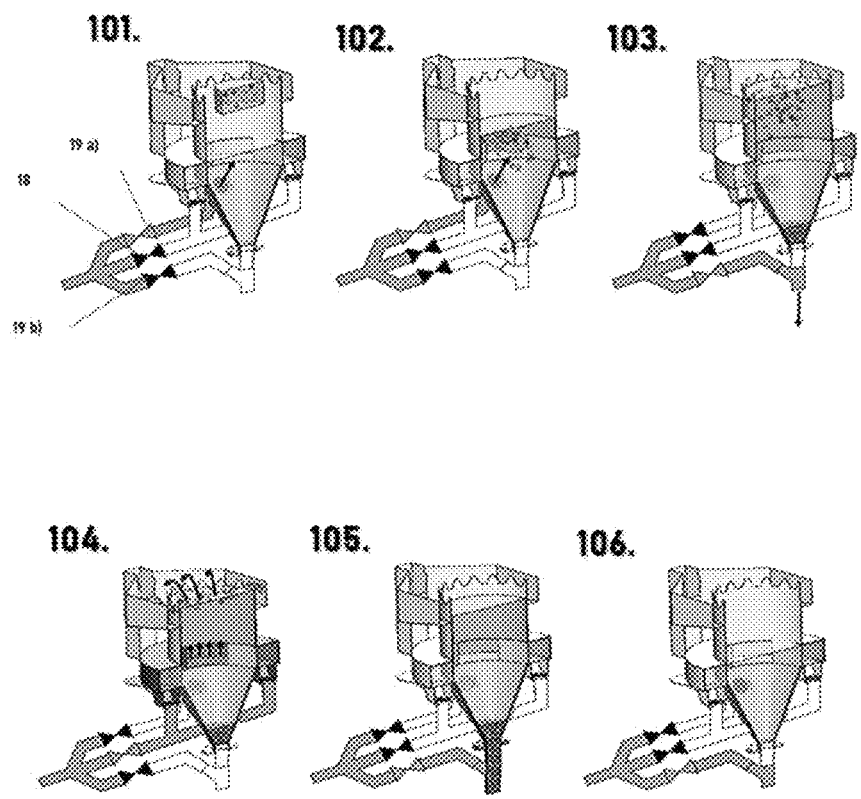
FIG. 6 is a diagram that explains steps of a separation process of FIG. 2 using the separation system of FIG. 5.

FIG. 6 is a series of views showing the separation that occurs in the separation system 6. According to 101, valve 19a is open as the mixture fall into the flotation tank 34. In 102, the action of the turbulent jet opening 35 helps destroy floating and/or non-floating aggregates of the mixture. 103 shows the transition when the valve 19b opens and valve 19a close as the mixture separates itself in the flotation tank 34, by respective flotation of polymer particles and decantation of sand. More particularly, due to the density difference between plastic and water, the plastic floats to the top of the flotation tank 34. Concurrently, sand sinks to the bottom of the flotation tank 34. During the settling and separation, the process may refrain from injecting water into the flotation tank 34 so as not to affect the decantation of the particles. To avoid closing and reopening the pump system 10, water may be guided into the sand evacuation pipe 9 back to the environment. 104 illustrates the moment when the valve 18 is opened, and flow is regulated to create a laminar flow or low turbulence flow) entering the flotation tank 34. As a consequence, an overflow is generated and skims into the gutter 33 entraining floating particles in it. 105 shows the moment where the valve 18 is closed and where valve 19b reopens at the same time as the outlet valve 32 letting the decanted sand exit through the sand evacuation pipe 9 in a flow of water. 106 show the moment when the valve 32 closes and when a separation cycle is over. In an embodiment, the process may return to 101, if another cycle is to be performed.

Figure 7:
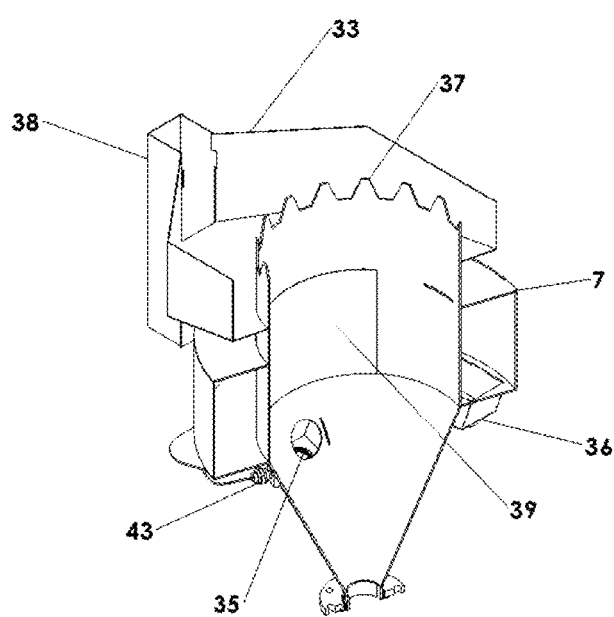
FIG. 7 is a partially sectioned perspective view of a flotation tank used in the separation system of FIG. 5.

FIG. 7 is a partially sectioned perspective view illustrating an embodiment of the flotation tank 34, such as the one used in the separation system 6 of FIG. 5. In one of the embodiments, the water flow generated by the pump system 10 is directed in different pipes as in FIG. 5. The turbulent jet opening(s) 35 is located on the bottom of a conical part of the flotation tank 34. The conical part is an optional taper to reduce a dimension of outlet of the flotation tank 34. Other tank shapes are considered in addition to the combination of a straight upper portion (e.g., cylindrical) and tapered lower portion (inverted frusto-conical portion).

The laminar jet opening(s) 36 leads in the water divergent ring 7 which may surround the flotation tank 34. The ring 37 is optional, and may form a holding chamber, with laminar flow input 39 into the flotation tank 34. The laminar flow input 39 may be in the form of an opening have a greater dimension than that of the laminar jet openings 36. Thus, due to an increase of the water input area in the laminar flow input 39, water velocity is reduced to a level where the flow is considered as laminar or of little turbulence. Thus, the velocity of the water is reduced, but the flow rate is maintained so that the level of water raises in the separation system 6 to cause an overflow that allows floating particles to leave the tank 34. Having a laminar and/or low turbulence flow entering the flotation tank 34 instead of a turbulent flow, after separation (decantation) allows the plastic particles to be more readily skimmed out from the flotation tank 34. A turbulent flow in the flotation tank 34 could cause a vortex that would entrain the plastic particles down into the flotation tank 34.

In this illustrated embodiment, the overflow drags the floating particles of the mixture out and allows the particles to fall with the water into the gutter 33. The peripheral edge of the flotation tank 34 may be provided with a jagged outline 37. The jagged outline 37 can take various shapes, such as tapering teeth (shown), crenellations, etc. The jagged outline 37 due to a reduction of the outlet paths may be used in conjunction with the flow rate of water in the flotation tank 34 to cause a higher level of water in the flotation tank 34, and hence induce a higher fall during the overflow 104 to entrain more of the floating particles out of the flotation tank 34. In an embodiment, the separation step and the flow regulation for overflow may be controlled by a central processing unit or like microprocessor and/or with appropriate sensors that may be triggered based on information such as water levels, e.g., pressure sensor 43 located in the conical part of the flotation tank 34, among other sensors that may be used. A fluid convergent 38 may then direct the water with plastic particles out of the gutter 33.

In an embodiment, the separation system 6 uses compressed air to destroy aggregates. A line from the compressor 14 may be directed into the tank 34 to inject pressurized air against the mixture accumulating in the tank 34. In another embodiment, the laminar flow and the turbulent flow are created by the same conduit and nozzle, with the water pressure being adjusted to create the different types of flow. For example, both flows can be achieved via the opening 35 or the input 39, with a greater or lesser pumping power, for example.

Figure 8:
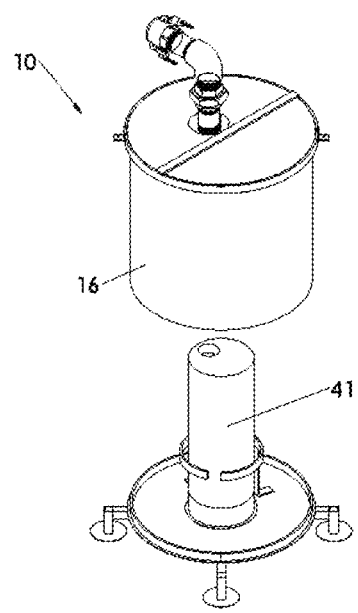
FIG. 8 is an exploded view of a water supplying components of a pump system of the granular litter cleaning apparatus of FIG. 1.

FIG. 8 is an exploded view illustrating exemplary water supplying components composing the pump system 10 of FIG. 5. In one embodiment, the flow of water needed in the separation system 6 is supplied by the pump system 10. In an embodiment, an inlet to the pump system 10 is placed in a water source near the cleaning apparatus 10. For example, the pump system 10 may have a submersible pump 41 and a pump cover 16. The pump cover 16 may have a mesh screen or other like filtration mechanism to prevent larger solids from entering the submersible pump 41 from the water source. As an alternative to a submersible pump 41, a pipe with a free end may be connected to a pump on the frame of the apparatus 1, the free end of the pipe extending to a source of water, such as a body of water. In such an embodiment, the pump system 10 may be regarded as open loop, as it loses the water it contains and pumps new water. As another embodiment, the apparatus 1 may have its own water storage tank and/or may recycle its water.

Figure 9:
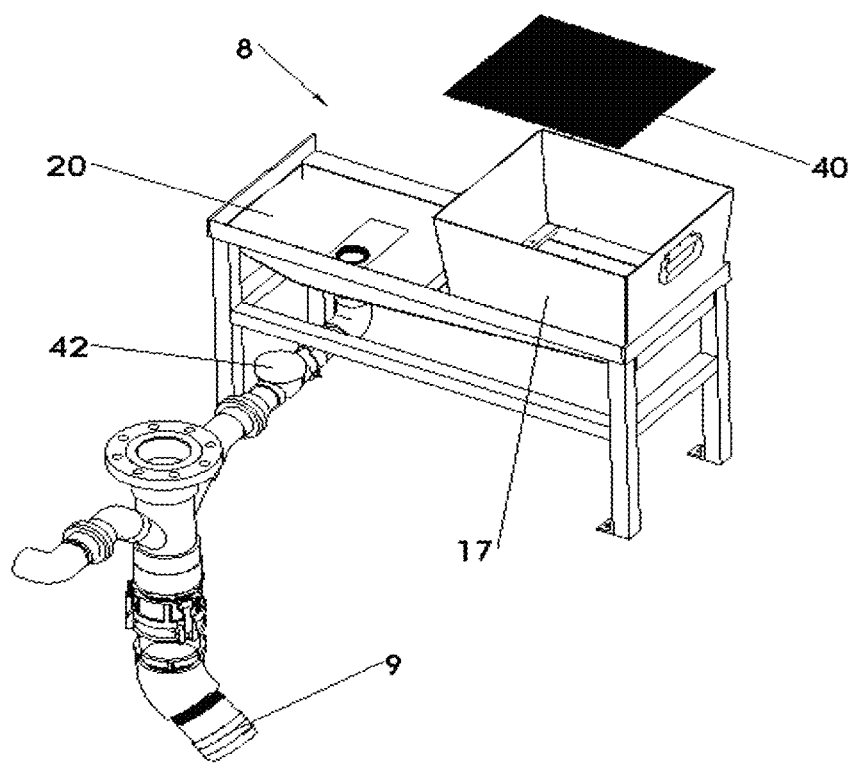
FIG. 9 is an exploded view of a filtration assembly of the granular litter cleaning apparatus of FIG. 1.

FIG. 9 is an exploded view illustrating an exemplary filtration assembly of the separation system 6 according to one embodiment. The waste recovering system 8 is used to separate the water-plastic mix, in this example, after it exits the gutter 33 (if present) through the fluid convergent 38 of FIG. 7. The water-plastic mix may be directed to a filter tank 17 or like receptacle. A filter 40 is located atop the filter tank 17 and may be used to block the solid particles as the water flows through it. The filter 40 may for example have mesh sized to retain plastic having a size of 0.05 mm, for example. The water may be recovered in a sink 20 that may then guide the water into a return pipe. In an embodiment, a check valve 42 allows the water to return to the environment by a pipe connected to the sand evacuation pipe 9 of FIG. 2. The check valve 42 is used to block water from the flotation tank 34 to reach the sink 20.

In an embodiment, shown for example in FIG. 1, the cleaning apparatus 10 has at least the separation system 6 having the separation tank 34 adapted to receive a mixture of granules and plastic litter, as well as water. The separation tank 34 has a top open end or windows (i.e., top opening), and a closeable bottom outlet. One or more water inlet 35, 36 feed water to the separation tank 34. A collect subsystem 2 may be used to convey a mixture of granules and plastic litter to the separation tank 34. A pump system 10 may be in fluid communication with the water inlet(s) 35, 36. The pump system 10 is operated, for instance by a controller unit 15, to raise a level of water in the separation tank 34 to skim water with plastic litter out through the top open end of the separation tank 34. The closeable bottom outlet is openable, for instance as driven by the controller unit 15, to empty the separation tank from granules decanted in a bottom of the separation tank 34.

In another embodiment, for instance exemplified by FIG. 2, a process for separating plastic litter from granules may include supplying a separation tank with a mixture of granules with plastic litter; feeding water into the separation tank; decanting granules and floating the plastic litter; feeding additional water in the separation tank to skim water with the plastic litter from a top of the separation tank; and outletting granules and water from a bottom of the separation tank. These steps may occur in an embodiment in the specific order set out in the previous sentence. These steps, or at least some of the steps, may be repeated in another cycle, or at intermittent times, or in different sequences. Feeding water into the separation tank may include creating an aggregate destroying turbulence in the water of the separation tank. Feeding additional water in the separation tank may include injecting water in a low turbulence flow. Outletting granules and water from a bottom of the separation tank may include outletting same to the environment. The plastic litter may be filtered out of the water after skimming. The mixture may be air conveyed into the separation tank. These steps may be driven by the controller unit 15, with appropriate time between steps to allow their completion. For example, decanting and floating may take a greater amount of time than the other steps.

It will be apparent to one with skill in the art that the cleaning apparatus of the present disclosure may be provided using some or all the mentioned features and components without departing from the spirit and scope of the present invention. It will also be apparent to the skilled artisan that the embodiment described above are specific examples of a single broader invention which may have greater scope than any of the singular description taught. There may be many alterations made in the description without departing from the spirit and scope of the present disclosure.

The invention claimed is:

1. A granular litter cleaning apparatus comprising:
    a separation system having a separation tank adapted to receive a mixture of granules and plastic litter, and water therein, the separation tank having a top opening, and a closeable bottom outlet, and at least one water inlet for feeding water to the separation tank;
    a collect subsystem for conveying a mixture of granules and plastic litter to the separation tank;
    a pump system in fluid communication with the water inlet;
    wherein the pump system is operated to raise a level of water in the separation tank to skim water with plastic litter out through the top opening of the separation tank;
    wherein the at least one water inlet of the separation tank includes a laminar flow inlet to raise the level of water in the separation tank with low turbulence; and
    wherein the closeable bottom outlet is openable to empty the separation tank from granules decanted in a bottom of the separation tank.

2. The granular litter cleaning apparatus according to claim 1, wherein the pump system has a flow regulating valve in a line connected to the laminar flow inlet to control the flow of water through the laminar flow inlet.

3. The granular litter cleaning apparatus according to claim 1, wherein the at least one water inlet of the separation tank includes a turbulent flow inlet to cause turbulence in the separation tank to destroy aggregates in the mixture.

4. The granular litter cleaning apparatus according to claim 3, wherein the separation tank has a top straight portion and a bottom tapered portion, the laminar flow inlet being connected to the top straight portion and the turbulent flow inlet being connected to the bottom tapered portion.

5. The granular litter cleaning apparatus according to claim 1, wherein the laminar flow inlet includes a chamber surrounding an outer wall of the separation tank, and an opening in the wall of the separation tank having a dimension greater than that of the laminar flow inlet.

6. The granular litter cleaning apparatus according to claim 1, wherein a top peripheral edge of the separation tank defines a jagged outline.

7. The granular litter cleaning apparatus according to claim 1, further comprising an actuated valve at the bottom outlet to selectively open and close the bottom outlet of the separation tank.

8. The granular litter cleaning apparatus according to claim 1, further comprising a gutter on an outer wall of the separation tank to collect water with plastic litter skimmed out of the separation tank.

9. The granular litter cleaning apparatus according to claim 8, further comprising a filtration assembly having a filter for separating water from the plastic litter.

10. The granular litter cleaning apparatus according to claim 1, wherein the collect subsystem has an air conveyor with a suction tool to collect the mixture of granules and plastic litter, a storage tank in the air conveyor to receive the mixture of granules and plastic litter, and a valve in a bottom of the storage tank to outlet the mixture of granules and plastic litter.

11. The granular litter cleaning apparatus according to claim 1, wherein the pump system is part of an open loop.

12. The granular litter cleaning apparatus according to claim 1, wherein the pump system includes a submersible pump.

* * * * *